May 12, 1964
A. W. MEEKS
3,132,886
AIRCRAFT TOW BAR
Filed May 12, 1961
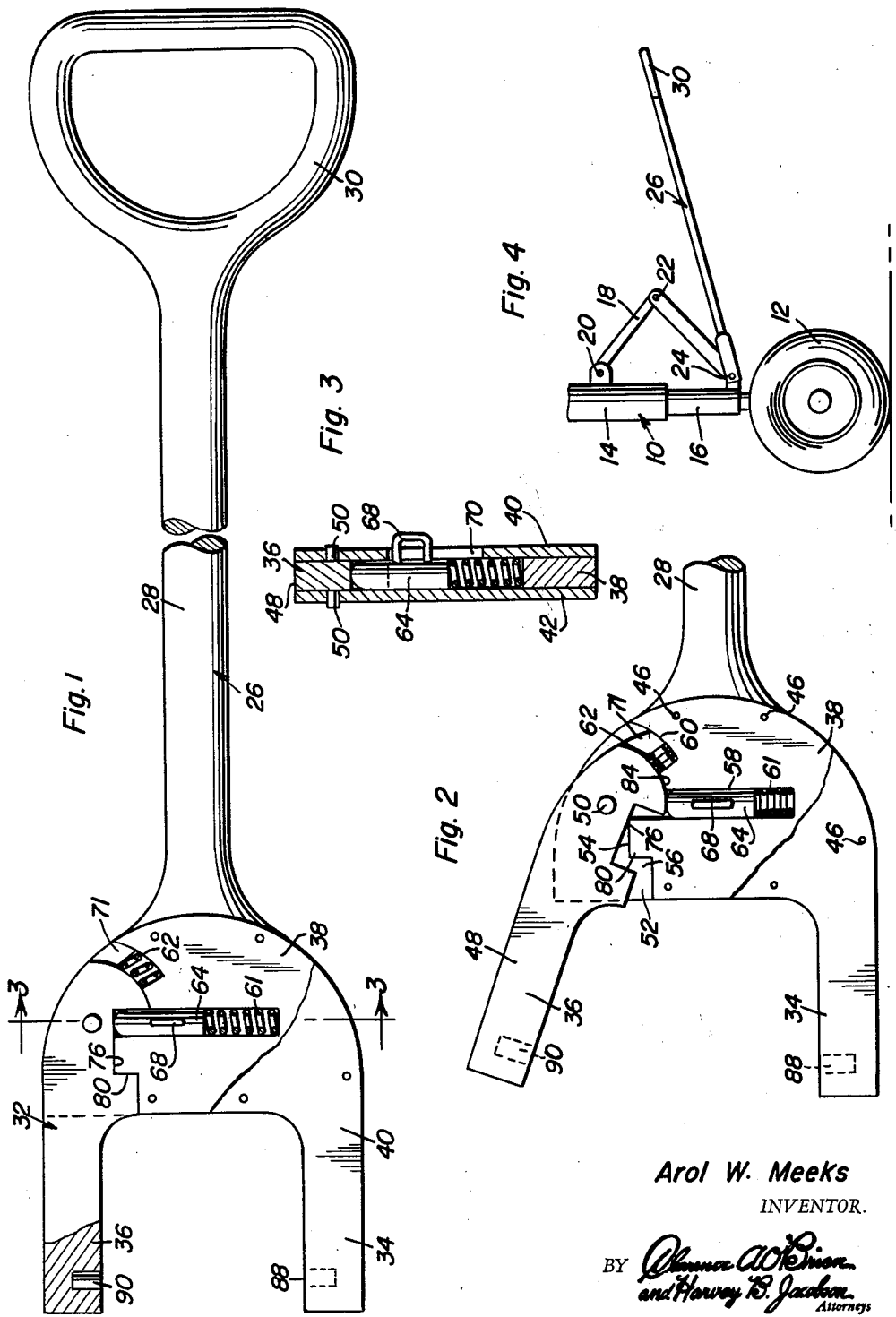
Arol W. Meeks
INVENTOR.
BY
Attorneys United States Patent Office 3,132,886
Patented May 12, 1964

3,132,886
AIRCRAFT TOW BAR
Arol W. Meeks, Kansas City, Mo., assignor to
Retha Frost, Kansas City, Mo.
Filed May 12, 1961, Ser. No. 109,539
2 Claims. (Cl. 294—16)

This invention relates to a tow bar which is particularly useful in connection with the towing of practically all aircraft.

An object of the invention is to provide a tow bar having a special locking construction at one end designed for easy and ready attachment to the landing gear of an aircraft.

Briefly, the invention is embodied in a bar with a pair of jaws in one end thereof, one of the jaws being rigid with the bar and the other being pivotally connected to the bar. The jaw arrangement is such as to form a fork adapted to embrace the strut of a landing gear of an aircraft and engage the scissors pin of the landing gear.

When the tow bar is engaged with the landing gear, it is impossible to remove unless the locking pin, constituting part of the tow bar, is disengaged from a notch in the pivoted jaw. Therefore, the tow bar is exceedingly safe in operation in that it will not inadvertently become disconnected during towing operations.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of a tow bar in accordance with the invention, parts being broken away to illustrate otherwise obscure details.

FIGURE 2 is a fragmentary elevational view showing the fork of the tow bar in the open position.

FIGURE 3 is a sectional view taken on the line 3—3 of FIGURE 1.

FIGURE 4 is a diagrammatic elevational view showing the tow bar in use.

In the accompanying drawings there is a landing gear strut 10 illustrated with a conventional wheel 12 at the lower end thereof. The illustrated strut is a hydraulic type having telescopically movable parts 14 and 16 together with a scissors linkage 18. The scissors linkage has three pins 20, 22 and 24 conventionally connecting it with movable parts 14 and 16 of the strut 10.

Tow bar 26 is designed particularly for use with such a landing gear, although the tow bar may be used with other types of landing gear so long as there is available a scissors pin 24 or an equivalent element.

The tow bar is made of a member 28 having a semicircular-shaped handle 30 at one end to facilitate pulling. The opposite end of the tow bar has a clamp 32 of special design.

The clamp is made of a pair of jaws 34 and 36, one of which is rigid and the other of which is pivotal. The jaw 34 is made of an integral extension 38 of bar 28, and there are two face plates 40 and 42 on extension 38 and ridigly held in place, as for example by rivets 46. Jaw 36 is made of a pivoted member 48 mounted between face plates 40 and 42 and capable of limited pivotal movement by being mounted on pivot pins 50 and located in a space 52 defined between face plates 40 and 42.

The edge 54 of extension 38 between face plates 40 and 42 defines the inner reach of a recess 56 receiving the inner extremity of pivoted member 48. Communicating with the space 52 is a straight bore 58 registering at one end with recess 56 in alignment with the pivot pin 50 as seen in FIGURES 1 and 2. A curved bore 60 spaced from straight bore 58 also registers with recess 56. The bores 58 and 60 are formed in the stock of extension 38, and they each seat springs. Spring 61 is in bore 58 and spring 62 is in bore 60. The spring 61 reacts on a locking pin 64 seated in bore 58 and having a handle 68 fixed to the side wall thereof and projecting through a slot 70 formed in face plate 40 (FIGURE 3).

Spring 62 bears against portion 71 of member 48 and opposes the pivotal movement of the member 48 in one direction. A laterally opening notch 76 is formed in member 48. A limit projection 80 along edge 54 is nested in the notch 76 (FIGURE 2). The arrangement of notch 76 and projection 80 forms a lock with pin 64 which is adapted to project into a portion of notch 76 when member 48 is essentially parallel to jaw 34 (FIGURE 1). Thus, when latched the pin 64 is backed by the projection 80 to resist lateral thrust applied thereto by any load on the jaw 36. The spring 61 constantly biases pin 64 in such a direction as to hold the upper end of the pin in notch 76 without applying any opening or closing bias on the jaw 36 in view of the radial alignment of the pin 64 with the pivots 50 and hence also not displaceable by the jaw regardless of the load placed thereon in order to positively prevent opening of the jaw as aforementioned. There is a cam surface 84 which is preferably smoothly curved, on the inner end of member 48 to allow the upper rounded end of pin 64 to slide smoothly thereover during the pivotal movement of member 48 avoiding both pivotal bias and locking action on the jaw 36 when opened.

In use, the confronting openings 88 and 90 formed in the adjacent sides of jaws 34 and 36 are adapted to receive the scissors pin 24. The jaw 36 is opened by retracting pin 64 and pivotally moving member 48 to the position shown in FIGURE 2. When the opening 90 or 88 is aligned with pin 24, jaw 36 is closed bringing it parallel to jaw 34 and engaging the openings 88 and 90 with the ends of pin 24. Locking pin 64 then projects into a portion of notch 76, and this very securely holds the movable jaw 36 in a locked position.

Thereafter the airplane can be moved about by simply pulling on the tow bar.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A thrust applying tool comprising an elongated member, thrust applying means operatively connected to one end of said elongated member, fixed jaw means connected to an opposite end of said elongated member, movable jaw means pivotally mounted about a pivotal axis fixed in said fixed jaw means, limit means fixedly mounted on said fixed jaw means for engagement with said movable jaw means to limit movement thereof relative to said pivotal axis in one direction toward an operative position, selectively retractile latch means operatively mounted by the fixed jaw means and engageable with the movable jaw means in the said operative position thereof to lock the movable jaw means on the limit means and prevent movement thereof in a direction opposite to said one direction from the operative position, and means continuously urging said movable jaw means in said one direction relative to the pivotal axis, said latch means comprising a displaceable latch element displaceable into a recess formed in the movable jaw means which simultaneously receives the limit means when the movable jaw means is in said operative position, and spring means continuously holding said latch element in engagement with the movable jaw means in all positions thereof without imposing any directional bias on the movable jaw means.

2. The combination of claim 1, wherein said movable jaw means comprises, a pivotal member, pivot means mounted on the member in alignment with the latch means for radial displacement thereof by said spring means relative to the pivotal axis when the pivotal member is disposed in the operative position, and an arcuate surface portion formed on said pivotal member engageable by the latch means for holding thereof retracted against the bias of the spring means in all but said operative position of the pivotal member.

References Cited in the file of this patent

UNITED STATES PATENTS

| | | |
|---|---|---|
| 967,713 | Blom | Aug. 16, 1910 |
| 2,424,095 | Horton | July 15, 1947 |
| 2,449,680 | Wak et al. | Sept. 21, 1948 |
| 2,547,772 | Peters | Apr. 3, 1951 |
| 2,783,059 | Hartl | Feb. 26, 1957 |
| 2,873,995 | Turner | Feb. 17, 1959 |